(12) United States Patent
Breese

(10) Patent No.: US 11,506,253 B2
(45) Date of Patent: Nov. 22, 2022

(54) DURABLE BUMPER

(71) Applicant: DRiV Automotive Inc., Lake Forest, IL (US)

(72) Inventor: Darrell Breese, Lake Forest, IL (US)

(73) Assignee: DRiV Automotive Inc., Lake Forest, IL (US)

( * ) Notice: Subject to any disclaimer, the term of this patent is extended or adjusted under 35 U.S.C. 154(b) by 49 days.

(21) Appl. No.: 17/060,422

(22) Filed: Oct. 1, 2020

(65) Prior Publication Data

US 2022/0106998 A1  Apr. 7, 2022

(51) Int. Cl.
| F16F 9/49 | (2006.01) |
| F16F 9/32 | (2006.01) |
| F16F 9/58 | (2006.01) |
| F16F 9/54 | (2006.01) |

(52) U.S. Cl.
CPC .............. *F16F 9/49* (2013.01); *F16F 9/3221* (2013.01); *F16F 9/54* (2013.01); *F16F 9/58* (2013.01); *F16F 2230/007* (2013.01); *F16F 2238/04* (2013.01)

(58) Field of Classification Search
CPC .... F16F 9/49; F16F 9/3221; F16F 9/54; F16F 9/58; F16F 2230/007; F16F 2238/04
See application file for complete search history.

(56) References Cited

U.S. PATENT DOCUMENTS

| 4,711,463 A | 12/1987 | Knable et al. |
| 4,804,169 A | 2/1989 | Hassan |
| 4,828,232 A | 5/1989 | Harrod et al. |
| 4,838,393 A * | 6/1989 | Mourray ................. F16F 7/082 188/284 |
| 5,941,510 A | 8/1999 | Grass et al. |
| 8,931,768 B2 | 1/2015 | Geisler et al. |
| 9,186,948 B2 | 11/2015 | Patil et al. |
| 9,835,220 B2 * | 12/2017 | Kontny ..................... F16F 9/49 |
| 10,533,624 B2 * | 1/2020 | Ishimaru ................... F16F 9/49 |
| 2017/0097063 A1 * | 4/2017 | Kontny ................... F16F 9/366 |
| 2019/0353221 A1 * | 11/2019 | Hertz ........................ F16F 9/49 |

FOREIGN PATENT DOCUMENTS

| DE | 1145445 B * | 3/1963 | ............... F16F 9/58 |
| DE | 102011116899 | 4/2012 | |
| DE | 102013207130 | 10/2014 | |
| EP | 1640634 A1 * | 3/2006 | ............... F16F 9/58 |
| FR | 2786838 A1 * | 6/2000 | ............. F16F 1/377 |
| JP | 4717698 | 4/2011 | |
| KR | 1020060021991 | 3/2006 | |
| KR | 1020060089000 | 8/2006 | |
| KR | 1020080086166 | 9/2008 | |
| WO | 2018036999 | 3/2018 | |

* cited by examiner

*Primary Examiner* — Xuan Lan Nguyen
(74) *Attorney, Agent, or Firm* — Burris Law, PLLC

(57) ABSTRACT

A rebound bumper for a shock absorber includes a first portion formed from a first material having a first spring rate and a second portion coupled to the first portion and formed from a second material having a second spring rate greater than the first spring rate. The first portion and the second portion are configured to fit on a piston rod between a piston and a rod guide assembly of the shock absorber. Also, the rebound bumper exhibits a displacement under load relationship with the first spring rate, the second spring rate, and a third spring rate greater than the first spring rate and less than the second spring rate.

20 Claims, 3 Drawing Sheets

DURABLE BUMPER

FIELD

The present disclosure relates to bumpers and particularly to rebound bumpers for shock absorbers.

BACKGROUND

The statements in this section merely provide background information related to the present disclosure and may not constitute prior art.

A vehicle shock absorber has a pressure tube and a piston attached to a piston rod disposed within the pressure tube. A hydraulic fluid (e.g., oil) is contained with the pressure tube and the piston sliding within the pressure tube and "working" on the hydraulic fluid dampens shock impulses via viscous friction.

For example, when a tire of a vehicle runs over or hits a "bump" on a road surface, the tire is displaced towards the vehicle frame and the piston slides within and towards a bottom end of the pressure tube against and/or through the hydraulic fluid. Accordingly, the work by the piston on the hydraulic fluid converts kinetic energy into thermal energy, thereby absorbing or dampening the impact of the tire with the bump on the road surface.

After rolling over the bump, the shock absorber decompresses or "rebounds" such that the piston slides away from the bottom end of the pressure tube and towards an upper end of the pressure tube. Depending on the speed of the vehicle and the size of the bump, among other factors, the piston can impact the upper end of the pressure tube, damage the piston or upper end of the pressure tube, and make an undesired noise (e.g., a clicking or knocking sound). Accordingly, shocks absorbers include a "rebound bumper" between the piston and the upper end of the pressure tube in order to absorb the impact of the piston during such a "rebound event."

The present disclosure addresses the issues of durability of rebound bumpers among other issues related to rebound bumpers.

SUMMARY

This section provides a general summary of the disclosure and is not a comprehensive disclosure of its full scope or all of its features.

In one form of the present disclosure, a rebound bumper for a shock absorber with a pressure tube, a piston, a piston rod, and a rod guide assembly, includes a first portion formed from a first material having a first spring rate and a second portion coupled to the first portion and formed from a second material having a second spring rate greater than the first spring rate. The first portion and the second portion are configured to be disposed on (i.e., fit on) the piston rod between the piston and the rod guide assembly. Also, the rebound bumper exhibits a displacement under load relationship with the first spring rate, the second spring rate, and a third spring rate greater than the first spring rate and less than the second spring rate.

In some variations, the first portion is a first ring and the second portion is a second ring. And in at least one variation, the first portion is a first ring with a plurality of alternating thick portions and thin portions extending along a circumferential direction. In such a variation, the first ring can have an undulating shape in the circumferential direction.

In some variations, the first portion is a first ring formed from an elastomeric material and the second portion is a second ring formed from a material selected from the group consisting of a metallic material and a polymer material. In at least one variation, the metallic material is steel and the polymer material is a nylon blend.

In some variations, the first portion is a first ring and the second portion is a second ring disposed within the first ring. In such variations, the first ring can have an outer diameter ranging from and between about 20 mm and about 75 mm and the second ring can have an inner diameter ranging from and between about 5 mm and about 40 mm.

In other variations, the first portion is a first ring, the second portion is a second ring, and the first ring is disposed within the second ring. In such variations, the first ring can have an inner diameter ranging from and between about 5 mm and about 40 mm and the second ring can have an outer diameter ranging from and between about 20 mm and about 75 mm.

In some variations, the second portion is a second ring with a wave shape in the circumferential direction. For example, the second ring can be a wave spring.

In at least one variation, the rebound bumper consists essentially of the first portion and the second portion, and the first portion is a first ring formed from an elastomeric material and the second portion is a second ring formed from a material selected from the group consisting of a metallic material and a polymer material.

In some variations, a shock absorber with the pressure tube, the piston, the piston rod, and the rod guide assembly are included and the first portion and the second portion are disposed on the piston rod between the piston and the rod guide assembly.

In another form of the present disclosure, a rebound bumper for a shock absorber includes a first ring formed from an elastomeric material with a first spring rate and a second ring coupled to the first ring and formed from a second material having a second spring rate greater than the first spring rate. The first ring has a plurality of alternating thick portions and thin portions extending along a circumferential direction, and the first ring and the second ring are configured to be disposed on a piston rod between a piston and a rod guide assembly of the shock absorber. Also, the rebound bumper exhibits a displacement under load relationship with the first spring rate, the second spring rate, and a third spring rate greater than the first spring rate and less than the second spring rate.

In some variations, the second ring is disposed within the first ring, while in other variations the first ring is disposed within the second ring.

In still another form of the present disclosure, a shock absorber includes a pressure tube, a piston rod, a piston, a rod guide assembly and a rebound bumper disposed on the piston rod between the piston and the rod guide assembly within the pressure tube. The rebound bumper consists essentially of a first ring formed from a first material having a first spring rate and a second ring coupled to the first ring and formed from a second material having a second spring rate greater than the first spring rate. The first ring has a plurality of alternating thick portions and thin portions extending along a circumferential direction and the rebound bumper exhibits a displacement under load relationship with the first spring rate, the second spring rate, and a third spring rate greater than the first spring rate and less than the second spring rate. In some variations, the first material is an elastomeric material and the second material is steel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
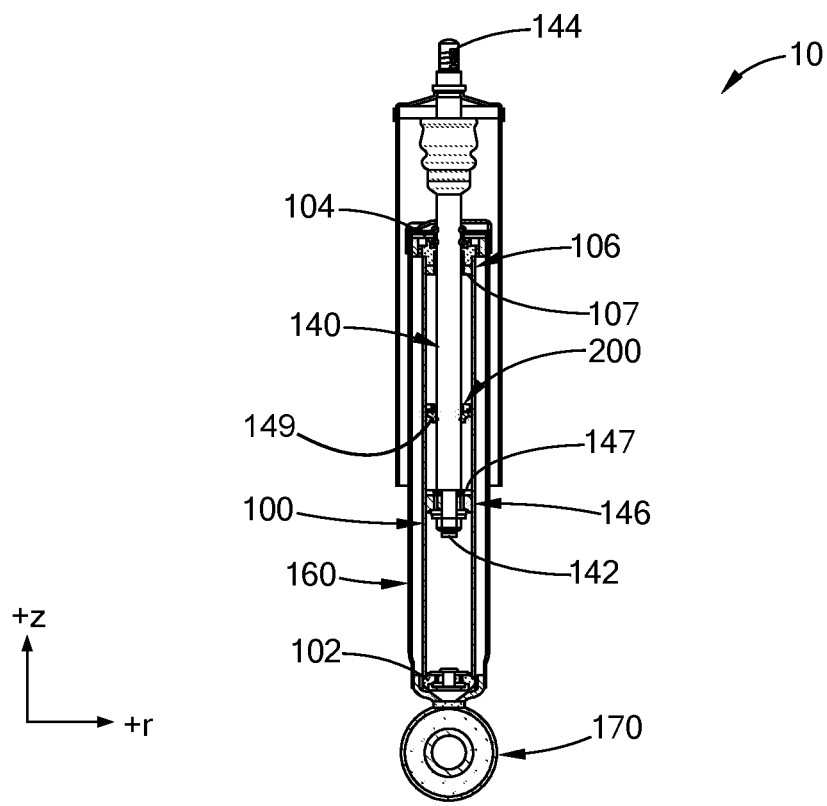
FIG. 1 is a side cross-section view of a shock absorber according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components and devices to provide a thorough understanding of variations of the present disclosure. It will be apparent to those skilled in the art that specific details need not be employed and that the examples provided herein, may include alternative forms or variations and are not intended to limit the scope of the disclosure. In some examples, well-known processes, well-known device structures, and well-known technologies are not described in detail.

Referring to FIG. 1, a shock absorber 10 with a rebound bumper 200 according to the teachings of the present disclosure is shown. The shock absorber 10 includes a pressure tube 100 with a lower (−z direction) end 102 and an upper end 104 (+z direction). A rod guide assembly 106 is disposed within the pressure tube 100 at the upper end 104 and a piston rod 140 is disposed and slides within the rod guide assembly 106. A piston 146 is attached to the piston rod 140 proximate a lower end 142, and the piston 146 has an upper surface 147 and one or more valves (not shown) to permit fluid to pass through the piston 146 in a controlled manner. The piston rod 140 has a lower end 142 disposed within the pressure tube 100 and an upper end 144 disposed outside of the pressure tube 100. The rebound bumper 200 is disposed on the piston rod 140 and is supported by a rod collar 149 between the piston 146 and the rod guide assembly 106 within the pressure tube 100. In some variations, a mount 170 is attached to the lower end 102 such that the lower end 102 is attached or mounted to an unsprung weight (e.g., a wheel) and the upper end 144 of the piston rod is attached or mounted to a sprung weight (e.g., a vehicle frame).

In some variations, the shock absorber 10 is a twin tube shock absorber 10 with an outer tube 160 disposed around and sealed to the pressure tube 100. In such variations, the outer tube 160 serves as a reservoir for a hydraulic fluid (e.g., oil) and the lower end 102 of the pressure tube 100 includes at least one valve (not shown) such that the hydraulic fluid flows between the pressure tube 100 and the outer tube 160 during use or operation of the shock absorber 10.

Figure 2:
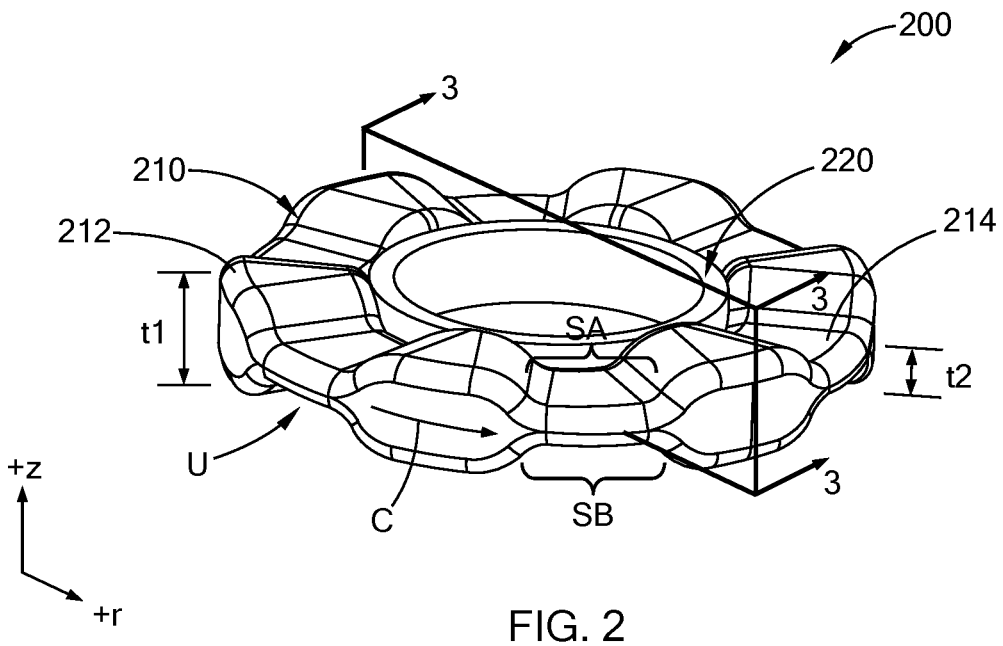
FIG. 2 is a perspective view of a rebound bumper according to one form of the present disclosure.
Figure 3:
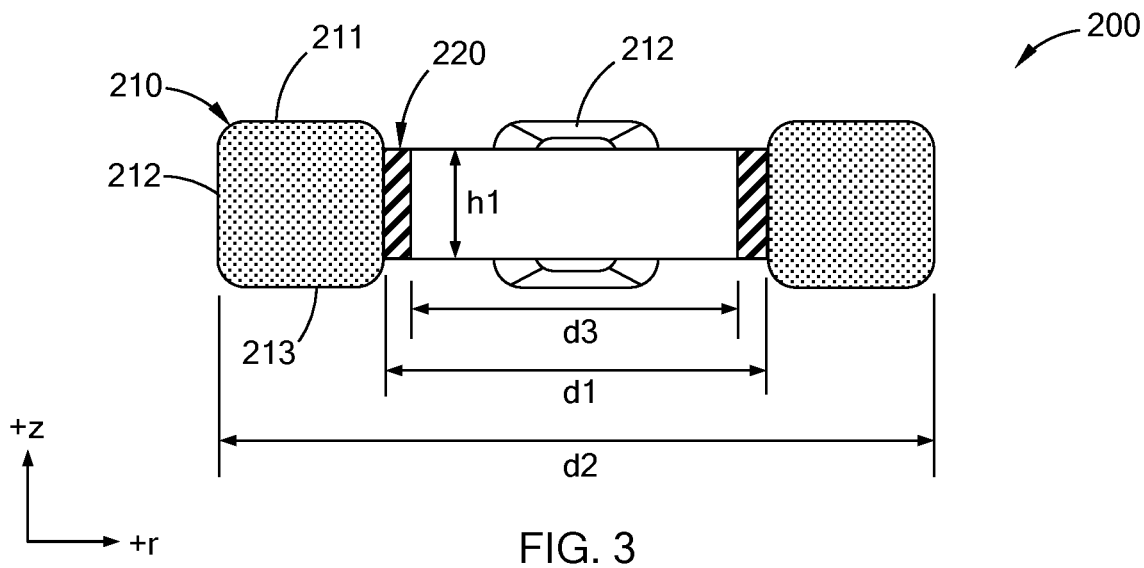
FIG. 3 is a cross sectional view of section 3-3 in FIG. 2.

Referring to FIGS. 2 and 3, a perspective view of the rebound bumper 200 according to one form of the present disclosure is shown in FIG. 2 and a cross sectional view of section 3-3 in FIG. 2 is shown in FIG. 3. The rebound bumper 200 includes a first portion 210 and a second portion 220. In some variations, the first portion 210 and the second portion 220 are formed from the same material. In other variations the first portion 210 is formed from a first material and the second portion 220 is formed from a second material that is different than the first material. In such variations, the first material has a first elasticity and a first spring rate and the second material has a second elasticity and a second spring rate that is different than the first elasticity and the first spring rate, respectively. As used herein, the term or phrase "spring rate" refers to the change in displacement (D) of a material as a function of load (L) on the material (i.e., $\Delta D/\Delta L$). In at least one variation, the first spring rate is less than the second spring rate.

Non-limiting examples of the first material include natural rubber and elastomers with viscoelasticity, a low Young's modulus and a high failure to strain such as isoprene rubber, butadiene rubber, chloroprene rubber, butyl rubber, ethylene propylene rubber, epichlorohydrin rubber, polyacrylic rubber, silicone rubber, urethanes, among others. Non-limiting examples of the second material include nylon, high-density polyethylene, urethanes, steel, stainless steel, among others.

The first portion 210 has an undulating shape 'U' in a circumferential direction 'C' as shown in FIG. 2. In some variations, a plurality of alternating thick (z direction) sections 212 with a thickness t1 and thin sections 214 with a thickness t2 (t2<t1) define the undulating shape U. In at least one variation, an upper space 'SA" and a lower space "SB" are present or provided between the alternating thick sections 212. Also, the first portion 210 has an inner dimension 'd1' (e.g., an inner diameter d1) and an outer dimension 'd2' (e.g., an outer diameter d2).

The second portion 220 has a ring shape and is disposed within the first portion 210. In some variations, the second portion 220 has a constant thickness 'h1' (FIG. 3), a constant width (r direction), an inner dimension 'd3' (e.g., an inner diameter d1) and an outer dimension 'd1' (e.g., an outer diameter d1). In some variations the first portion 210 is molded onto the second portion 220.

The inner dimension d3 of the second portion 220 provides for the rebound bumper 200 to slide on and relative to the piston rod 140 and the outer dimension d2 of the first portion 210 provides for the rebound bumper to slide within and relative to pressure tube 100. Non-limiting examples of the outer dimension d2 range from and between about 20 mm to about 75 mm, and non-limiting examples of the inner dimension d3 range from and between about 5 mm to about 40 mm.

During a rebound event, the rebound bumper 200 is compressed between the rod collar 149 and the rod guide assembly 106, and an upper surface 211 and a lower surface 213 of the thick sections 212 are displaced (compressed) towards each other. In addition, the upper and lower spaces SA, SB provide openings or volume for the thick sections 212 to deform into, and unlike traditional rebound bumpers, the rebound bumper 200 dampens undesired rebound noise and has enhanced durability as explained below.

When the shock absorber 10 is in use, the upper end 144 of the piston rod 140 is attached to a frame of a vehicle (not shown) and the mount 170 is attached to a wheel of the vehicle (not shown). As discussed above, when the vehicle travels along a surface (e.g., a road) and a tire of the vehicle hits a bump on or in the surface, the shock absorber is subjected to a shock impulse and the piston 146 slides within the pressure tube 100 towards the lower end 102 of the pressure tube 100 (i.e., the shock absorber 10 compresses). The shock impulse is dampened by the piston 146 working on the hydraulic fluid, and after the tire rolls over the bump, the shock absorber 10 decompresses or rebounds as the piston 146 slides within the pressure tube 100 towards the upper end 104 of the pressure tube 100. If sufficiently forceful, the decompression of the shock absorber 10 results in a rebound event and the rebound bumper 200 is compressed between the rod collar 149 and a lower surface 107 of the rod guide assembly 106. Also, repeated rebound events can limit the durability (lifetime) of a rebound bumper as described below.

Figure 4:
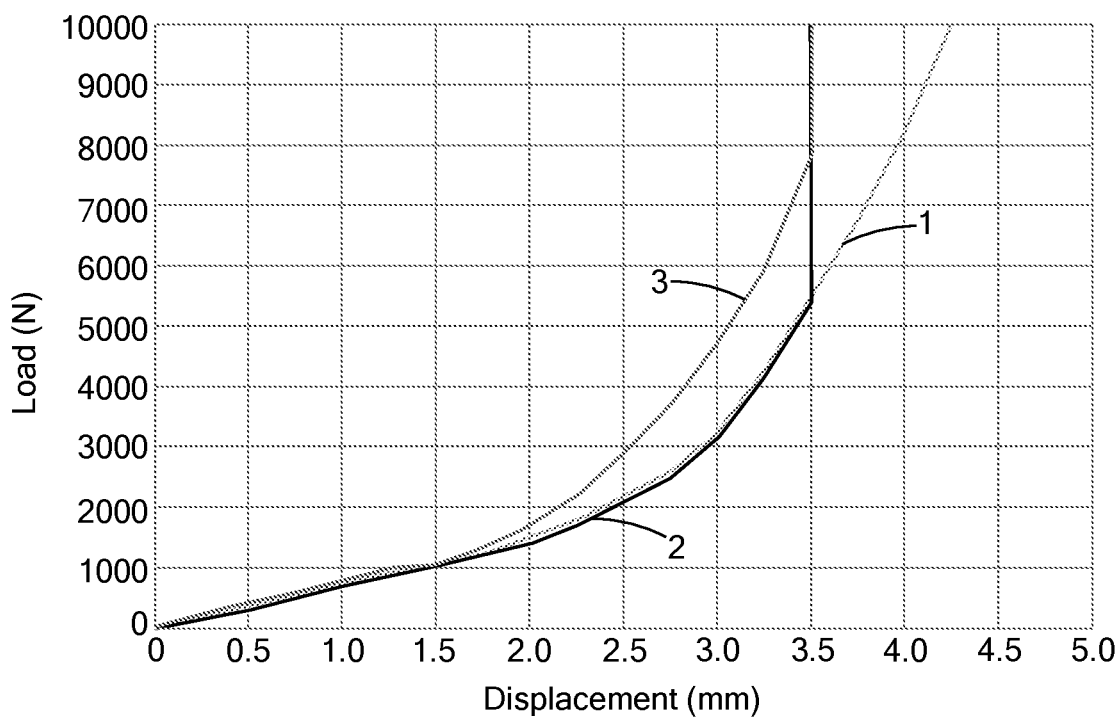
FIG. 4 is a graphical plot of load versus displacement for three different rebound bumpers.

Referring to FIG. 4, plots simulating load versus displacement (i.e., compression) of a traditional rebound bumper (curve 1), a limited travel rebound bumper (curve 2), and the rebound bumper 200 (curve 3) is shown. The traditional rebound bumper was simulated as a simple ring shaped elastomeric bumper with a thickness (z direction) of 5 mm, the limited travel rebound bumper was simulated as a two-piece bumper with a ring shaped elastomeric (soft) portion having a thickness of 5 mm and a ring shaped stiff portion disposed within the ring shaped elastomeric portion. Also, a high spring rate of the ring shaped stiff portion was engaged after 3.5 mm of compression of the ring shaped elastomeric portion. The rebound bumper 200 was simulated as the two-piece bumper shown in FIGS. 2-3 with the first portion 210 having a thickness of 5 mm and a high spring rate of the second portion 220 engaged after 3.5 mm of compression of the first portion 210. The plots were calculated/simulated with the traditional rebound bumper, the ring shaped elastomeric portion of the limited travel bumper and the first portion 210 of the rebound bumper 200 made from a material having a low spring rate (e.g., natural rubber), and the ring shaped stiff portion of the limited travel rebound bumper and the second portion 220 of the rebound bumper made from steel.

As shown by curve 1, deformation of the traditional rebound bumper is not constrained and displacement continuously increases with increasing load. Also, curve 1 provides a baseline for and comparison with a material with a low spring rate. The limited travel rebound bumper (curve 2) demonstrates the same load versus displacement as the traditional rebound bumper (curve 1) up to a displacement of 3.5 mm, but is constrained from additional displacement such that curve 2 has a first section that is the same as curve 1 from 0 to 3.5 mm of displacement and 0 to about 5,000 Newtons (N), and a second section corresponding to loads greater than 5,000 N. Accordingly, the limited travel rebound bumper (curve 2) is subjected to loads between about 5,000 N and 10,000 N without additional displacement. That is, the ring shaped elastomeric portion of the limited travel rebound bumper is subjected to a maximum load of only 5,000 N, however, the ring shaped stiff portion is subjected to loads greater than 5,000 N.

The rebound bumper 200 demonstrates the same load versus displacement as the traditional rebound bumper (curve 1) up to a displacement of about 1.5 mm, but then exhibits a higher spring rate between about 1.5 mm and 3.5 mm. Accordingly, curve 3 has a first section with a low spring rate that is the same as curve 1 from 0 to about 1.5 mm displacement and 0 to about 1,000 N, a second section with a higher spring rate between about 1.5 mm and 3.5 mm displacement and 1,000 to about 7,5000 N, and a third section corresponding to loads greater about 7,500 N. Stated differently, the first portion 210 and the second portion 220 exhibit a displacement under load relationship having the first spring rate, the second spring rate, and a third spring rate greater than the first spring rate and less than the second spring rate. And it should be understood that the intermediate (third) spring rate increases the load bearing capacity of the rebound bumper 200 compared to the limited travel rebound bumper by 50% before reaching 3.5 mm of displacement.

Figure 5:
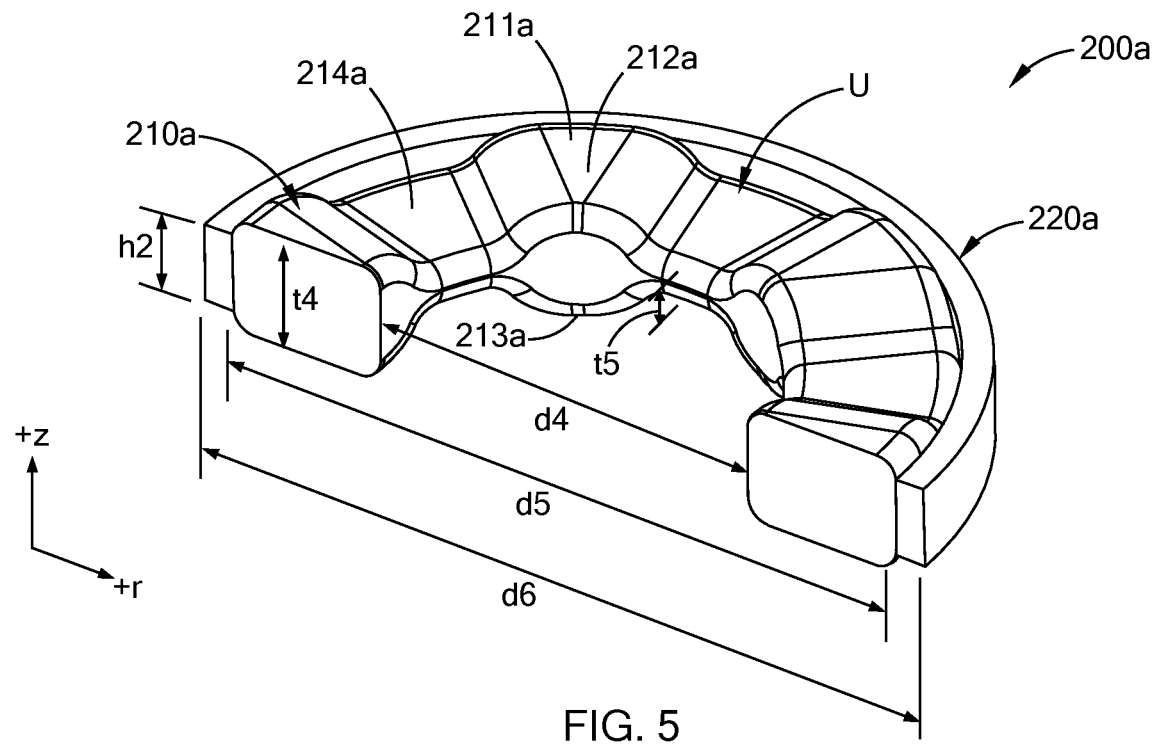
FIG. 5 is a cross sectional view of a rebound bumper according to another form of the present disclosure.

Referring to FIG. 5, a perspective cross sectional view of a rebound bumper 200a according to another form of the present disclosure is shown in FIG. 5. And similar to the rebound bumper 200, the rebound bumper 200a includes a first portion 210a formed from a first material with a low spring rate and a second portion 220a formed from a second material with a high spring rate. However, and in contrast to the rebound bumper 200, the second portion 220b in the form of a ring is disposed around or outside of the first portion 210a.

Still referring to FIG. 5, the first portion 210a has an undulating shape 'U' in a circumferential direction 'C' and, in some variations, a plurality of alternating thick (z direction) sections 212a with a thickness t4 and thin sections 214a with a thickness t5 (t5<t4) define the undulating shape U. Also, the first portion 210a has an inner dimension 'd4' (e.g., an inner diameter d4) and an outer dimension 'd5' (e.g., an outer diameter d5).

The second portion 220a has a ring shape and is disposed around or outside of the first portion 210a. In some variations, the second portion 220a has a constant thickness 'h2', a constant width (r direction), an outer dimension 'd6' (e.g., an outer diameter d6) and an inner dimension 'd5' (e.g., an inner diameter d5). In at least one variation, the first portion 210a is molded onto the second portion 220a.

The inner dimension d4 of the first portion 210a provides for the rebound bumper 200a to slide on and relative to the piston rod 140 and the outer dimension d6 of the second portion 220a provides for the rebound bumper 200a to slide within and relative to pressure tube 100. Non-limiting examples of the outer dimension d6 range from and between about 20 mm to about 75 mm, and non-limiting examples of the inner dimension d4 range from and between about 5 mm to about 40 mm.

Similar to the rebound bumper 200, during a rebound event the rebound bumper 200a is compressed between the piston 146 and the rod guide assembly 106, and an upper surface 211a and a lower surface 213a of the thick sections 212a are displaced towards each other. In addition, upper and lower spaces (not labeled) between the alternating thick sections 212a provide openings or volume for the thick sections 212a to deform into. And unlike traditional rebound bumpers, the rebound bumper 200a has enhanced durability as described above for rebound bumper 200.

Figure 6:
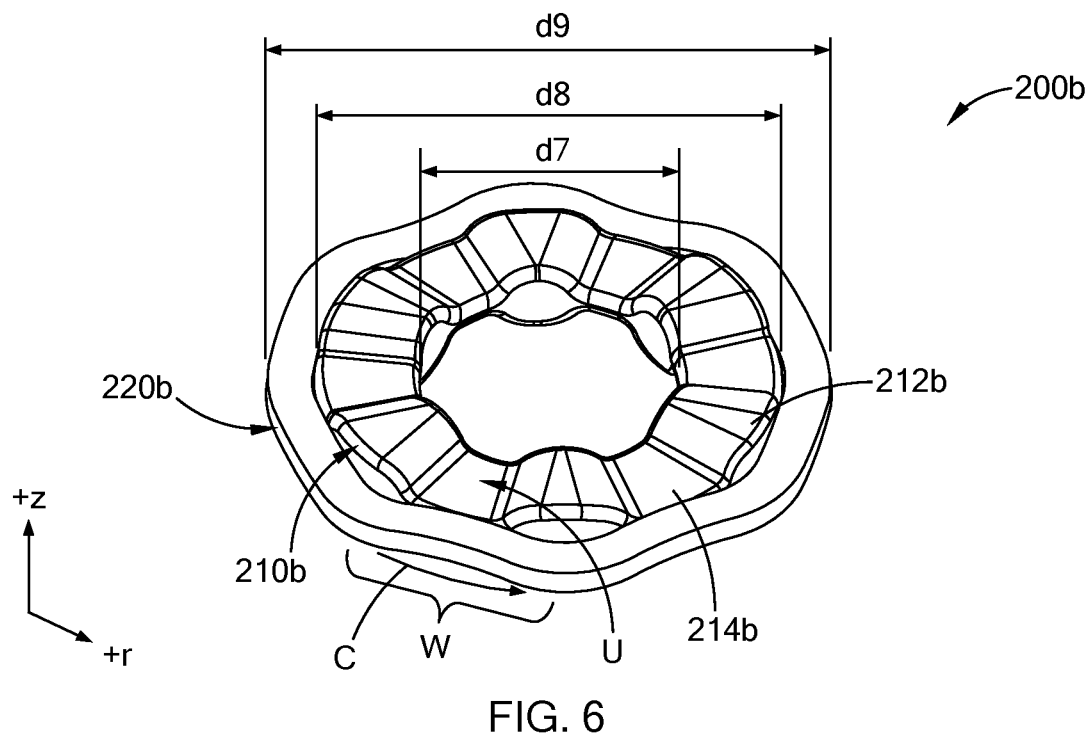
FIG. 6 is a perspective view of a rebound bumper according to still another form of the present disclosure.

Referring to FIG. 6, a perspective view of a rebound bumper 200b according to still another form of the present disclosure is shown. Similar to the rebound bumper 200 and the rebound bumper 200a, the rebound bumper 200b includes a first portion 210b formed from a first material with a low spring rate and a second portion 220b formed from a second material with a high spring rate. However, and in contrast to rebound bumper 200a, the second portion 220b is in the form of a ring with a wave shape 'W' in the circumferential direction C (e.g., a wave spring). That is, an upper (+z direction) surface and a lower (−z direction) surface of the second portion 220b do not lie within a plane and the engagement of the second portion 220b is the distance between peaks of the wave shape in the +z and −z directions.

Still referring to FIG. 6, the first portion 210b has an undulating shape 'U' in a circumferential direction 'C' and, in some variations, a plurality of alternating thick (z direction) first sections 212b with a first thickness (not labeled) and thin second sections 214b with a second thickness (not labeled) less than the first thickness define the undulating shape U. Also, the first portion 210b has an inner dimension 'd7' (e.g., an inner diameter d7) and an outer dimension 'd8' (e.g., an outer diameter d8).

As noted above, the second portion 220b has a ring shape and is disposed around or outside of the first portion 210b. In some variations, the second portion 220b has a constant thickness (not labeled), a constant width (r direction), an outer dimension 'd9' (e.g., an outer diameter d9) and an inner dimension 'd8' (e.g., an inner diameter d8). In some variations the first portion 210b is molded onto the second portion 220b.

The inner dimension d7 of the first portion 210b provides for the rebound bumper 200b to slide on and relative to the piston rod 140 and the outer dimension d9 of the second portion 220b provides for the rebound bumper 200b to slide within and relative to pressure tube 100. Non-limiting examples of the outer dimension d9 range from and between about 20 mm to about 75 mm, and non-limiting examples of the inner dimension d7 range from and between about 5 mm to about 40 mm.

Similar to the rebound bumper 200, during a rebound event the rebound bumper 200b is compressed between the piston 146 and the rod guide assembly 106, and an upper surface (not labeled) and a lower surface (not labeled) of the thick sections 212b are displaced towards each other. In addition, upper and lower spaces (not labeled) between the alternating thick sections 212b provide openings or volume for the thick sections 212b to deform into. Also, the rebound bumper 200b has enhanced load carrying capacity and durability as described above for rebound bumper 200.

While the rebound bumper 200b shown in FIG. 6 has the second portion 220b disposed around or outside the first portion 210b, it should be understood that the first portion 210b can be disposed around or outside of the second portion 220b as described above for rebound bumper 200.

It should be understood from the teachings of the present disclosure that a durable rebound bumper, e.g., an ultra-durable rebound bumper, with a first portion made from a first material and a second portion made from a second material is provided. The first material has a low spring rate and the second material has a high spring rate that is greater than the low spring rate. In combination, the first portion and the second portion provide a rebound bumper with three spring rates when subjected to loads. Particularly, when subjected to low loads (e.g., less than 1,000 N), the rebound bumper exhibits the low spring rate, when subjected to intermediate loads (e.g., between 1,000 and 7,500 N) the rebound bumper exhibits an intermediate spring rate, and when subjected to high loads (e.g., greater than 7,500 N), the rebound bumper exhibits a high spring rate. The intermediate spring rate increases the load carrying capacity of the first portion and increases the durability of the rebound bumper.

When an element or layer is referred to as being "on," "mounted on", "engaged to," "connected to", "coupled to," or "attached to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A rebound bumper for a shock absorber with a pressure tube, a piston, a piston rod, and a rod guide assembly, the rebound bumper comprising:
 a first portion is a first ring disposed about a central axis, the first portion being formed from a first material having a first spring rate, wherein the first portion defines a plurality of thick sections and a plurality of thin sections, the thick sections being spaced apart from each other in a circumferential direction about the central axis by a corresponding thin section of the plurality of thin sections, wherein each thick section has a top surface and a bottom surface and each thin section has a top surface and a bottom surface that are disposed axially between the top and bottom surfaces of the thick sections; and
 a second portion coupled to the first portion and formed from a second material having a second spring rate greater than the first spring rate, wherein the first portion and the second portion are configured to be disposed on the piston rod between the piston and the rod guide assembly.

2. The rebound bumper according to claim 1, wherein the second portion is a second ring concentric with the first ring and the first and second rings overlap axially.

3. The rebound bumper according to claim 2, wherein the second ring is disposed entirely axially between the top and bottom surfaces of the thick sections.

4. The rebound bumper according to claim 1, wherein the first portion is formed from an elastomeric material and the second portion is a second ring formed from a material selected from the group consisting of a metallic material and a polymer material.

5. The rebound bumper according to claim 4, wherein the metallic material is steel and the polymer material is a nylon blend.

6. The rebound bumper according to claim 1, wherein the second portion is a second ring that axially overlaps with the first ring, wherein an inner diameter of the second ring is less than an inner diameter of the first ring.

7. The rebound bumper according to claim 6, wherein the first ring has an outer diameter between about 20 mm and about 75 mm and the second ring has an inner diameter between about 5 mm and 40 mm.

8. The rebound bumper according to claim 1, wherein the second portion is a second ring that axially overlaps with the first ring, and an outer diameter of the first ring is less than an inner diameter of the second ring.

9. The rebound bumper according to claim 8, wherein the first ring has an inner diameter between about 5 mm and 40 mm and the second ring has an outer diameter between about 20 mm and about 75 mm.

10. The rebound bumper according to claim 1, wherein the second portion is a second ring with a wave shape in the circumferential direction the second ring axially overlapping with the first ring.

11. The rebound bumper according to claim 1, wherein the rebound bumper consists essentially of the first portion and the second portion.

12. The rebound bumper according to claim 11, wherein the first portion is formed from an elastomeric material and the second portion is a second ring formed from a material selected from the group consisting of a metallic material and a polymer material.

13. The rebound bumper according to claim 1 further comprising the pressure tube, the piston, the piston rod, and the rod guide assembly, wherein the first portion and the second portion are disposed on the piston rod between the piston and the rod guide assembly.

14. A rebound bumper for a shock absorber, the rebound bumper comprising:
 a first ring disposed about a central axis and formed from a first material having a first spring rate, the first ring having a plurality of alternating thick portions and thin portions, the thick portions being thicker in an axial direction of the central axis than the thin portions, wherein the first ring is symmetrical across a plane that is perpendicular to the central axis; and
 a second ring coupled to the first ring and formed from a second material having a second spring rate greater than the first spring rate, wherein the second ring is thicker in the axial direction than the thin portions and thinner in the axial direction than the thick portions, wherein the first ring and the second ring are configured to be disposed on a piston rod between a piston and a rod guide assembly of the shock absorber.

15. The rebound bumper according to claim 14, wherein the second ring is disposed within the first ring.

16. The rebound bumper according to claim 14, wherein the first ring is disposed within the second ring.

17. The rebound bumper according to claim 14 further comprising:
 the pressure tube, the piston rod, the piston, and the rod guide assembly, wherein the rebound bumper is disposed on the piston rod between the piston and the rod guide assembly within the pressure tube.

18. The shock absorber according to claim 14, wherein the first material is an elastomeric material and the second material is steel.

19. A rebound bumper for a shock absorber, the rebound bumper comprising:
 a first ring disposed about a central axis and formed from a first material having a first spring rate, the first ring having a plurality of alternating thick portions and thin portions, the thick portions being thicker in an axial direction of the central axis than the thin portions; and
 a second ring coupled to the first ring and formed from a second material having a second spring rate greater than the first spring rate, wherein the second ring is thicker in the axial direction than the thin portions and thinner in the axial direction than the thick portions, wherein the first ring and the second ring are configured to be disposed on a piston rod between a piston and a rod guide assembly of the shock absorber, wherein the second ring is disposed within the first ring.

20. The rebound bumper according to claim 19 further comprising the pressure tube, the piston, the piston rod, and the rod guide assembly, wherein the first portion and the second portion are disposed on the piston rod between the piston and the rod guide assembly.

* * * * *